United States Patent
Mayumi

(10) Patent No.: US 10,521,067 B2
(45) Date of Patent: Dec. 31, 2019

(54) SENSOR-EQUIPPED DISPLAY DEVICE, CONTROL DEVICE, AND CONTROL METHOD

(71) Applicant: SHARP KABUSHIKI KAISHA, Sakai, Osaka (JP)

(72) Inventor: Masashi Mayumi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 116 days.

(21) Appl. No.: 15/740,784

(22) PCT Filed: Jul. 6, 2016

(86) PCT No.: PCT/JP2016/069965
§ 371 (c)(1),
(2) Date: Dec. 28, 2017

(87) PCT Pub. No.: WO2017/006951
PCT Pub. Date: Jan. 12, 2017

(65) Prior Publication Data
US 2018/0196553 A1    Jul. 12, 2018

(30) Foreign Application Priority Data
Jul. 7, 2015   (JP) ................................. 2015-136307

(51) Int. Cl.
*G06F 3/041*    (2006.01)
*G06F 3/047*    (2006.01)
(Continued)

(52) U.S. Cl.
CPC .............. *G06F 3/047* (2013.01); *G06F 3/044* (2013.01); *G06F 3/0412* (2013.01);
(Continued)

(58) Field of Classification Search
CPC combination set(s) only.
See application file for complete search history.

(56) References Cited

U.S. PATENT DOCUMENTS

2013/0093722 A1    4/2013  Noguchi et al.
2013/0314361 A1*  11/2013  Saitoh ................... G06F 3/0412
                                                                     345/173
(Continued)

FOREIGN PATENT DOCUMENTS

JP    2013-084168 A    5/2013
WO   2014/041716 A1   3/2014
(Continued)

*Primary Examiner* — Temesghen Ghebretinsae
*Assistant Examiner* — Sosina Abebe
(74) *Attorney, Agent, or Firm* — ScienBiziP, P.C.

(57) ABSTRACT

A sensor-equipped display device includes a scanning driving unit (4) that repeats a scanning operation of selecting scanning lines (G) sequentially in a first direction, and a data driving unit (5) that applies a voltage to data lines (S). The display device further includes a detection control unit (30) that repeats a scanning operation of driving drive lines (DRL) sequentially in the first direction, and detects signals of detection lines (SNL). During a period that overlaps a period for the screen scanning operation with respect to the scanning lines, the detection control unit executes the screen scanning operation with respect to the drive lines, and in the screen scanning operation with respect to the drive lines, the detection control unit outputs the driving signal, avoiding the drive line in an area corresponding to the scanning line that is being selected by the scanning driving unit.

6 Claims, 10 Drawing Sheets

(51) Int. Cl.
*G06F 3/044* (2006.01)
*G06F 3/05* (2006.01)
*H04N 3/14* (2006.01)

(52) U.S. Cl.
CPC .............. *G06F 3/0416* (2013.01); *G06F 3/05* (2013.01); *H04N 3/14* (2013.01)

(56) References Cited

U.S. PATENT DOCUMENTS

| | | | |
|---|---|---|---|
| 2015/0042616 A1* | 2/2015 | Takagi | G06F 3/0412 345/174 |
| 2015/0049061 A1 | 2/2015 | Takagi et al. | |
| 2015/0193053 A1 | 7/2015 | Takagi et al. | |

FOREIGN PATENT DOCUMENTS

| | | |
|---|---|---|
| WO | 2014/041717 A1 | 3/2014 |
| WO | 2014/136155 A1 | 9/2014 |

\* cited by examiner

| P1 | P2 | P3 | P4 | P5 | P6 | P7 | P8 | ... | |
|---|---|---|---|---|---|---|---|---|---|
| DNL6 | DNL5 | DNL9 | DNL7 | DNL8 | DNL3 | DNL10 | DNL8 | | |

SENSOR-EQUIPPED DISPLAY DEVICE, CONTROL DEVICE, AND CONTROL METHOD

TECHNICAL FIELD

The disclosure of the present application relates to a sensor-equipped display device including a screen that displays an image, and a sensor that detects contact or approach of an object with respect to the screen.

BACKGROUND ART

In recent years, a sensor-equipped display device that includes a display unit including a screen to display an image, and a touch panel that detects contact or approach of an object such as a finger or a pen with respect to the screen has been commercialized. In the sensor-equipped display device, driving signals for the display unit can be noise and exert influences on the touch panel. Besides, the driving signals for the touch panel also can be noise for the display unit. The display unit and the touch panel can interfere with each other in this way, which causes the respective signal-noise (SN) ratios to decrease, resulting in that malfunctions occur, or the detection accuracy or the display quality deteriorate, in some cases.

In order to suppress the interference between the display unit and the touch panel, the controlling is performed with the driving timing of the display unit and the driving timing of the touch panel being associated with each other. For example, in the display device having a touch detection function disclosed in Patent Document 1 indicated below, the display elements are driven in such a manner that M horizontal lines are sequentially displayed in each of a plurality of unit driving periods that compose one frame period. Further, touch detection elements are driven during N touch detection periods provided in the unit driving period, N being smaller than M.

In this way, one frame period is divided into a period for display and a period for detection on the touch panel, and the driving for display and the driving for detection are executed sequentially, whereby interference with each other can be suppressed.

PRIOR ART DOCUMENT

Patent Document

Patent Document 1: JP-A-2013-84168

SUMMARY OF THE INVENTION

Problem to be Solved by the Invention

If the resolution of the display unit is increased, a period required for driving the display unit increases. If the time required for driving the display unit increases, the period that can be assigned for the touch panel decreases, which makes it difficult to balance the driving of the display unit and the driving of the touch panel well. Besides, if a sufficient period for driving the touch panel cannot be ensured, this can deter the performance of the touch panel from improving.

The present application discloses a sensor-equipped touch panel, a control device, and a control method with which a period for the driving operation for display, and a period for the driving operation for detecting an object can be ensured, while the interference between the driving operations can be suppressed.

Means to Solve the Problem

A sensor-equipped display device in one embodiment of the present invention relates to a sensor-equipped display device that includes a screen that displays an image, and a sensor that detects contact or approach of an object with respect to the screen. The sensor-equipped display device includes: a plurality of scanning lines that are arrayed in a first direction; a plurality of data lines that are arrayed in a second direction that is different from the first direction; a plurality of switching elements that are provided in correspondence to points of intersection between the scanning lines and the data lines, respectively; and a plurality of pixel electrodes that are connected to the switching elements, respectively.

The sensor-equipped display device further includes: a scanning driving unit that repeats a screen scanning operation with respect to the scanning lines, the screen scanning operation with respect to the scanning lines being an operation of selecting the scanning lines sequentially in the first direction throughout the screen; and a data driving unit that outputs a signal to the data lines in synchronization with the scanning of the scanning lines by the scanning driving unit, thereby applying, to the pixel electrodes, voltages corresponding to gray levels to be displayed, respectively;

The sensor-equipped display device still further includes: a plurality of drive lines that are arrayed in the first direction; a plurality of detection lines that are arrayed in the second direction; and a detection control unit that repeats a screen scanning operation of outputting a driving signal to the drive lines sequentially, and detects signals of the detection lines in correspondence to the driving signal.

During a period that overlaps a period for the screen scanning operation with respect to the scanning lines, the detection control unit executes the screen scanning operation with respect to the drive lines, and in the screen scanning operation with respect to the drive lines, the detection control unit outputs the driving signal, avoiding the drive line in an area corresponding to the scanning line that is being selected by the scanning driving unit.

Effect of the Invention

According to the disclosure of the present application, in the sensor-equipped display device, a period for the driving operation for display, and a period for the driving operation for detecting an object, can be ensured, while the interference between the driving operations can be suppressed.

MODE FOR CARRYING OUT THE INVENTION

Figure 1:
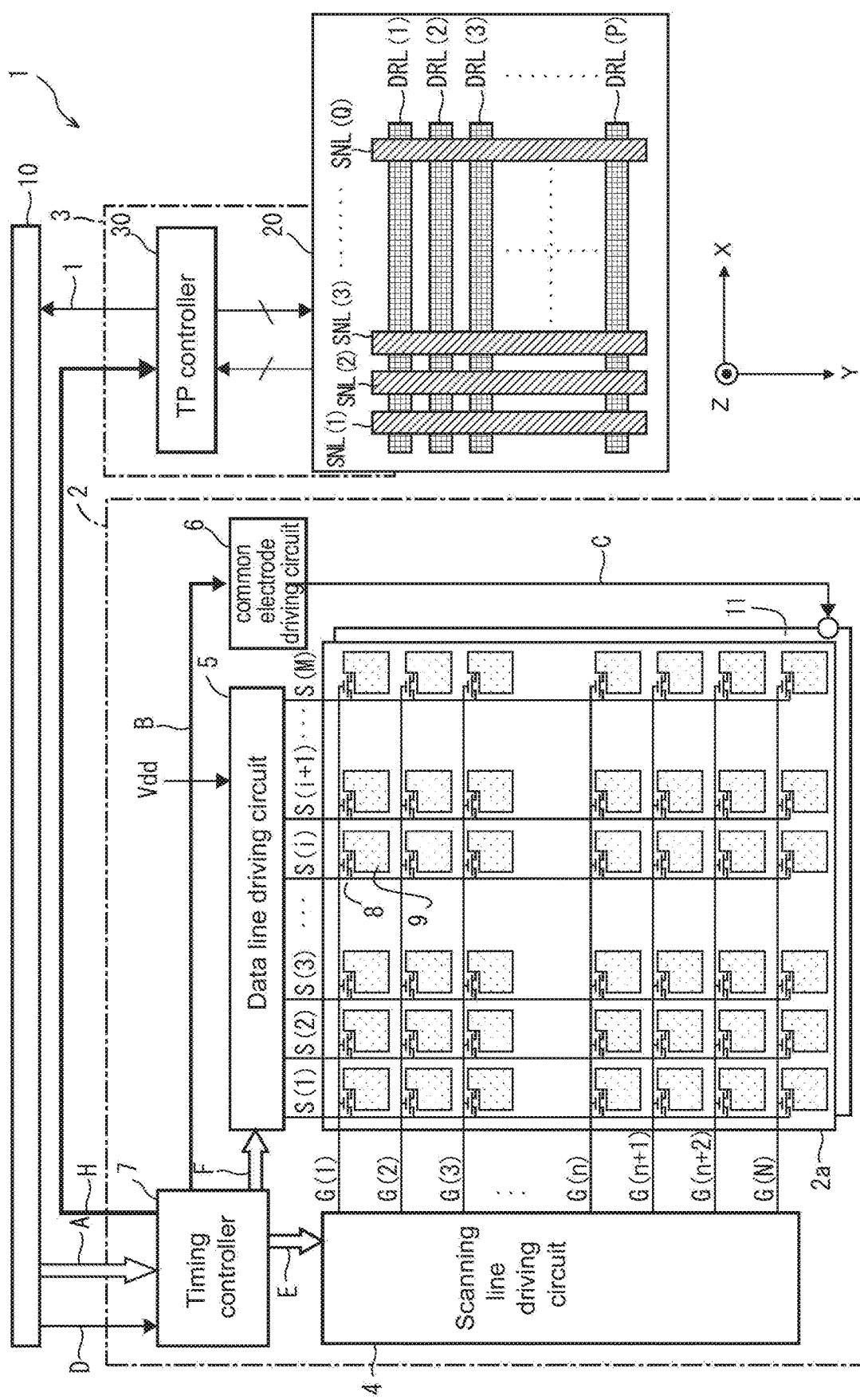
FIG. 1 is a block diagram illustrating an exemplary configuration of a sensor-equipped display device according to Embodiment 1.

A sensor-equipped display device in one embodiment of the present invention relates to a sensor-equipped display device that includes a screen that displays an image, and a sensor that detects contact or approach of an object with respect to the screen. The sensor-equipped display device includes: a plurality of scanning lines that are arrayed in a first direction; a plurality of data lines that are arrayed in a second direction that is different from the first direction; a plurality of switching elements that are provided in correspondence to points of intersection between the scanning lines and the data lines, respectively; and a plurality of pixel electrodes that are connected to the switching elements, respectively.

Further, the sensor-equipped display device includes: a scanning driving unit that repeats a screen scanning operation with respect to the scanning lines, the screen scanning operation with respect to the scanning lines being an operation of selecting the scanning lines sequentially in the first direction throughout the screen; and a data driving unit that outputs a signal to the data lines in synchronization with the scanning of the scanning lines by the scanning driving unit, thereby applying, to the pixel electrodes, voltages corresponding to gray levels to be displayed, respectively.

The sensor-equipped display device further includes: a plurality of drive lines that are arrayed in the first direction; a plurality of detection lines that are arrayed in the second direction; and a detection control unit that repeats a screen scanning operation of outputting a driving signal to the drive lines sequentially, and detects signals of the detection lines in correspondence to the driving signal.

During a period that overlaps a period for the screen scanning operation with respect to the scanning lines, the detection control unit executes the screen scanning operation with respect to the drive lines, and in the screen scanning operation with respect to the drive lines, the detection control unit outputs the driving signal, avoiding the drive line in an area corresponding to the scanning line that is being selected by the scanning driving unit (the first configuration).

According to the above-described configuration, the period for the screen scanning operation with respect to the scanning lines and the period for the screen scanning operation with respect to the drive lines overlap with each other. In other words, the screen scanning operation with respect to the scanning lines and the screen scanning operation with respect to the drive lines are simultaneously executed. This makes it easy to sufficiently ensure the driving period for display and the driving period for detecting an object. Further, in the screen scanning operation with respect to the drive lines, the detection control unit outputs the driving signal, avoiding the drive line in an area corresponding to the scanning line that is being selected by the scanning driving unit. This allows the position of the scanning line selected by the scanning driving unit, and the position of the drive line to which the driving unit outputs the driving signal not to overlap with each other. This allows the screen scanning operation with respect to the scanning lines and the screen scanning operation with respect to the drive lines to be executed simultaneously, in a state in which these hardly interfere with each other. As a result, a period for the driving operation for display, and a period for the driving operation for detecting an object, can be ensured, while the interference therebetween can be suppressed.

The above-described first configuration can be such that the detection control unit controls the outputting of the diving signal according to a synchronization signal for controlling timings of the selection of the scanning lines by the scanning driving unit (the second configuration).

With the synchronization signal, information on the timing for selecting each scanning line can be obtained. The use of this synchronization signal makes it possible to, with a simple processing operation, output the driving signal, avoiding the drive line in an area corresponding to the scanning line that is being selected.

The above-described second configuration may be such that the detection control unit outputs the driving signal to the drive lines in a preliminarily determined order, at the timings based on the synchronization signal, thereby outputting the driving signal to the drive lines outside the area corresponding to the scanning line that is being selected (the third configuration).

According to the third configuration, the driving signal is output to the drive lines according to the preliminarily set order, whereby quick control is enabled.

The above-described second configuration may be such that the detection control unit stops the outputting of the diving signal in the screen scanning operation at a timing based on the synchronization signal, thereby outputting the driving signal, avoiding the drive line in the area corresponding to the scanning line that is being selected (the fourth configuration).

According to the fourth configuration, by stopping outputting the driving signal, the driving signal can be prevented from being output to the drive line in the same area as the scanning line being selected, at the same timing as that for selecting the scanning line.

The above-described fourth configuration may be such that the scanning driving unit, in the screen scanning operation, selects the scanning lines sequentially, from the scanning line at one side end in the first direction to the scanning line at the other side end in the same direction. In this case, the detection control unit, in the screen scanning operation, can output the driving signal to the drive lines sequentially, from the drive line at the other side end in the first direction to the drive line at the one side end (the fifth configuration).

According to the fifth configuration, the direction in which the scanning lines are sequentially selected, and the direction in which the drive lines are sequentially driven, are opposite to each other. The position of the selected scanning line shifts from one side end to the other side end, and the position of the drive line to which the driving signal is output shifts from the other side end to the one side end. At a timing when the position of the selected scanning line and the position of the drive line to which the driving signal is output overlap, the outputting of the driving signal is stopped. In other words, the detection control unit outputs the driving signal to the drive lines sequentially in the order of the array of the drive lines, from the drive line at the other side end, and at a timing when the position of the selected scanning line and the position of the drive line to which the driving signal is output overlap with each other, the detection control unit stops the outputting to the drive line. This enables an operation of outputting the driving signal, avoiding the drive line in the same area as the scanning line being selected, with a simpler processing operation.

Any one of the above-described second to fifth configurations may be such that the detection control unit further includes: a frequency changing unit that changes a driving frequency of the driving signal: and a setting unit that determines, based on the driving frequency, the order of the drive lines to which the driving signal is to be output, or a period in which the outputting of the driving signal is stopped in the screen scanning operation (the sixth configuration).

According to the sixth configuration, the frequency changing unit can change the driving frequency of the driving signal. This therefore makes it possible to set an appropriate driving frequency according to, for example, changing environments such as noise environments. Further, the setting unit can appropriately set the order of the drive lines to which the driving signal is to be output, or the period while the outputting of the driving signal is stopped, according to changes of the driving frequency. This therefore makes it possible to appropriately change the control for avoiding the interference between the drive lines and the scanning lines, according to the driving frequency.

Any one of the above-described second to sixth configurations may be such that the synchronization signal includes a perpendicular synchronization signal and a horizontal synchronization signal that the scanning driving unit refers to when operating. In this case, the detection control unit can control the outputting of the driving signal, according to the number of pulses of the horizontal synchronization signal that are counted with reference to the perpendicular synchronization signal (the seventh configuration).

In the seventh configuration, the number of pulses of the horizontal synchronization signal that are counted with reference to the perpendicular synchronization signal is information that indicates the scanning line being selected. The detection control unit, therefore, can output the driving signal according to the number of pulses thus counted, avoiding the drive line in an area corresponding to the scanning line that is being selected.

Embodiments of the present invention encompass a control device that controls electronic equipment, too. The electronic equipment includes a screen that has a matrix of pixels, a plurality of drive lines arrayed in a direction vertical to rows of the pixels in an area that overlaps with the screen, and detection lines arrayed in a direction vertical to columns of the pixels, and detects contact or approach of an object with respect to the screen based on signals of the detection lines. The control device includes: a signal acquisition unit that receives a synchronization signal for controlling a timing at which updating of display of pixels in each row of the screen is started; a signal generation unit that generates a signal for controlling a driving signal to be output to the drive lines based on the synchronization signal; and an output unit that outputs the signal generated by the signal generation unit, or the diving signal based on the signal. The signal generation unit, in a period overlapping with a period for the updating of display of the screen, executes a screen scanning operation for outputting the driving signal to the drive lines, and in the screen scanning operation with respect to the drive lines, generates the signal so that the driving signal is output, avoiding the drive line in an area corresponding to a row of the pixels being subjected to the updating of display.

Embodiments of the present invention encompass a control method for controlling electronic equipment, too. The electronic equipment includes a screen that has a matrix of pixels, a plurality of drive lines arrayed in a direction vertical to rows of the pixels in an area that overlaps with the screen, and detection lines arrayed in a direction vertical to columns of the pixels, and detects contact or approach of an object with respect to the screen based on signals of the detection lines. The control method includes a step of receiving a synchronization signal for controlling a timing at which updating of display of pixels in each row of the screen is started; a signal generation step of generating a signal for controlling a driving signal to be output to the drive lines based on the synchronization signal; and an outputting step of outputting the signal generated in the signal generation step, or the diving signal based on the signal. In the signal generation step, in a period overlapping with a period for the updating of display of the screen, a screen scanning operation for outputting the driving signal to the drive lines is executed, and in the screen scanning operation with respect to the drive lines, the signal is generated so that the driving signal is output, with the drive line in an area corresponding to a row of the pixels being subjected to the updating of display being avoided.

The following description describes embodiments of the present invention in detail, while referring to the drawings. Identical or equivalent parts in the drawings are denoted by the same reference numerals, and the descriptions of the same are not repeated. To make the description easy to understand, in the drawings referred to hereinafter, the configurations are simply illustrated or schematically illustrated, or the illustration of part of constituent members is omitted. Further, the dimension ratios of the constituent members illustrated in the drawings do not necessarily indicate the real dimension ratios.

Embodiment 1

(Exemplary Configuration of Sensor-Equipped Display Device)

FIG. 1 is a block diagram illustrating an exemplary configuration of a sensor-equipped display device in Embodiment 1. The sensor-equipped display device 1 illustrated in FIG. 1 is electronic equipment that includes a screen that displays an image, and a sensor that detects contact or approach of an object with respect to the screen. The sensor-equipped display device 1 includes a display device 2, a detection device 3, and a system-side controller 10.

<Exemplary Configuration of Display Device>

The display device 2 has a plurality of gate lines G (G(1), G(2), . . . , G(n), . . . , G(N)) and a plurality of data lines S (S(1), S(2), . . . , S(i), . . . S(M)), which are arranged in a display region 2a, which corresponds to the screen that displays an image. The gate lines G are exemplary display scanning lines, and are arrayed in a first direction (the Y direction in the example illustrated in FIG. 1). The data lines S are arrayed in a second direction that is different from the first direction (the X direction that intersects with the Y direction at right angles in the example illustrated in FIG. 1).

At positions corresponding to the points of intersection of the gate lines G and the data lines S, thin film transistors (TFTs) 8 are provided. Each TFT 8 is connected to the gate line G and the data line S. Further, to each TFT 8, a pixel electrode 9 is connected. The TFT 8 is an exemplary switching element. The TFT 8 is switched ON/OFF according to a signal of the gate line G. When the TFT 8 is ON, a signal of the data line S is input to the pixel electrode 9. This causes a voltage corresponding to a gray level to be displayed at the pixel is applied to the pixel electrode 9.

In the display region 2a, one pixel is arranged in an area surrounded by two adjacent gate lines G and two adjacent data lines S. In the display region 2a, a plurality of pixels are arranged in matrix. Each pixel includes the TFT 8 and the pixel electrode 9. The area where the pixels are arranged is the display region 2a, that is, the screen. Further, a common electrode 11 is provided at a position opposed to the plurality of pixel electrodes 9.

The display device 2 further includes a timing controller 7, a scanning line driving circuit (gate driver) 4, a data line driving circuit (source driver) 5, and a common electrode driving circuit 6. The timing controller 7 is connected to the system-side controller 10, the scanning line driving circuit 4, the data line driving circuit 5, and the common electrode driving circuit 6. The scanning line driving circuit 4 is connected to the gate lines G. The data line driving circuit 5 is connected to the data lines S. The common electrode driving circuit 6 is connected to the common electrode 11.

The timing controller 7 receives a video signal (as indicated by arrow A) and a synchronization signal (as indicated by arrow D) from the system-side controller 10. The timing controller 7 outputs a video signal to the data line driving circuit 5 (as indicated by arrow F). Based on a synchronization signal D, to the scanning line driving circuit 4, the data line driving circuit 5, and the common electrode driving circuit 6, the timing controller 7 outputs a signal that serves as a reference signal that these circuits refer to when the circuits operate in synchronization with one another, that is, a signal for controlling an operation timing (as indicated by arrows E, F, B).

The synchronization signal D includes, for example, a vertical synchronization signal and a horizontal synchronization signal. The vertical synchronization signal can be a signal that indicates the timing for scanning the screen, that is, the timing for screen display updating. The horizontal synchronization signal can be a signal that indicates the timing for plotting the pixels in each row on the screen.

As one example, the timing controller 7 outputs a gate startpulse signal and a gate clock signal based on the vertical synchronization signal and the horizontal synchronization signal, to the scanning line driving circuit 4 (as indicated by arrow E). The gate startpulse signal can include, for example, a pulse that is generated at a timing corresponding to a timing at which a pulse of the vertical synchronization signal is generated. The gate dock signal can include a pulse that is generated at a timing corresponding to a timing at which a pulse of the horizontal synchronization signal Is generated.

The timing controller 7 outputs a source startpulse signal, a source latch strobe signal, and a source clock signal based on the vertical synchronization signal and the horizontal synchronization signal, to the data line driving circuit 5 (as indicated by arrow F).

The scanning line driving circuit 4 supplies a signal indicating an image to be displayed, to each data line S. The scanning line driving circuit 4 repeats a scanning operation of selecting the gate lines G in one screen sequentially in the first direction (the Y direction), at cycles indicated by the vertical synchronization signal. More specifically, the scanning line driving circuit 4 starts an operation of scanning one screen according to the gate startpulse signal, and applies a selection signal to the gate lines G sequentially according to the gate clock signal.

The operation of scanning one screen may be carried out by the progressive method in which all the gate lines G(1) to G(N) in one screen are sequentially selected, or alternatively, by the interlace method in which the gate lines are selected with a part of the same being skipped, for example, every other gate lines G are selected.

The data line driving circuit 5 outputs a signal based on a video signal to the data lines S, in synchronization with the scanning of the gate lines G by the scanning line driving circuit 4. With this, a voltage according to an image to be displayed can be applied to the pixel electrode 9. More specifically, the data line driving circuit 5 sequentially holds, in a register, a digital video signal indicating a voltage to be applied to each data line, at a timing at which the pulse of the source clock signal is generated. The digital video signal thus held is converted into an analog voltage, at a timing at which the pulse of the source latch strobe signal is generated. The analog voltage thus obtained by conversion is applied to the plurality of data lines S at once, as a video signal for driving.

The common electrode driving circuit 6 applies a predetermined voltage to the common electrode 11, based on the signal received from the timing controller 7 (as indicated by arrow C).

As is described above, at a timing at which the selection signal is applied to each gate line, the video signal for diving is applied to the data line S. and further, a predetermined voltage is applied to the common electrode 11, whereby an image is displayed on the display region 2a, that is, on the screen.

<Exemplary Configuration of Detection Device>

The detection device 3 is an exemplary sensor that detects contact or approach of an object such as a finger or a pen with respect to the screen of the display device 1. The detection device 3 includes a touch panel 20 and a touch panel controller (hereinafter referred to as a "TP controller") 30.

The touch panel 20 includes a plurality of drive lines DRL (DRL(1) to DRL(P)) arrayed in the first direction (in the Y direction in the example illustrated in FIG. 1), and a plurality of detection lines SNL (SNL(1) to SNL(Q)) arrayed in the second direction (in the X direction intersecting with the Y direction at right angles in this example). The drive lines DRL are electrodes extending in the second direction (the X direction). The detection lines SNL are electrodes extending in the first direction (the Y direction). The drive lines DRL are exemplary detection scanning lines.

In FIG. 1, for the sake of explanation, the touch panel 20 and the display region 2a of the display device 2 are drawn at positions that do not overlap in the Z direction, but actually, the touch panel 20 is arranged at a position that overlaps with the display region 2a of the display device 2 when viewed in the direction vertical to the screen. In other words, the drive lines DRL and the detection lines SNL are arranged so as to be superposed on the screen, which s the display region 2a. Further, the drive lines DRL are arranged so as to be arrayed in the same direction as the direction in which the gate lines G are arrayed (in the Y direction in the present example). The detection lines SNL are arranged so as to be arrayed in the same direction as the direction in which the data lines S are arrayed (in the X direction in the present example).

Figure 2:
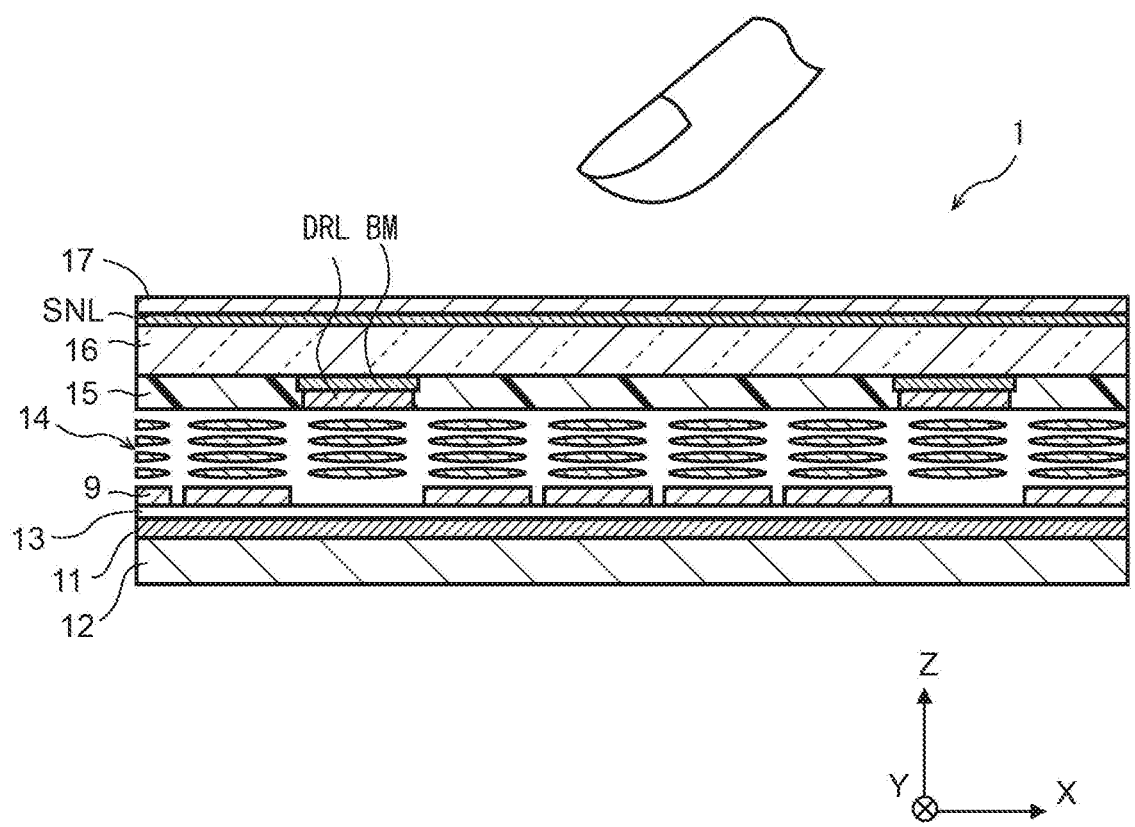
FIG. 2 is a cross-sectional view illustrating the exemplary configuration of the sensor-equipped display device 1 illustrated in FIG. 1.

FIG. 2 is a cross-sectional view illustrating an exemplary configuration of the sensor-equipped display device 1 illustrated in FIG. 1. In the example illustrated in FIG. 2, the sensor-equipped display device 1 includes a first substrate 12 and a second substrate 16 that are opposed to each other. Between the first substrate 12 and the second substrate 16, a liquid crystal layer 14 is provided.

On a surface of the first substrate 12 opposed to the second substrate 16, the common electrode 11 and the pixel electrodes 9 are provided. The common electrode 11 is provided at a position opposed to the pixel electrodes 9, with the insulating layer 13 being interposed therebetween. Further, the gate lines G, the data lines S, and the TFTs 8 are arranged on the first substrate 12, though these are not illustrated.

On a surface of the second substrate 16 opposed to the first substrate 12, a color filter 15 and the drive lines DRL are arranged. In the example illustrated in FIG. 2, on a surface of the color filter 15 on the liquid crystal layer 14 side, the drive lines DRL are formed. The color filter 15 includes a black matrix BM. The drive lines DRL are arranged on the liquid crystal layer 14 side of the black matrix BM. On a surface of the second substrate 16, on a side opposite to the first substrate 12 side, the detection lines SNL and a polarizing plate 17 are arranged.

In the present example, the display device 2 and the detection device 3 are integrally formed, with the first substrate 12 and the second substrate 16. Both of the drive lines DRL and the detection lines SNL are provided independently from the common electrode 11. In other words, the configuration is not such that the common electrode 11 of the display device 2 doubles as the drive lines DRL or the detection lines SNL of the touch panel 20. This makes the driving of the touch panel 20 less restricted by the driving of the display device 2.

The first substrate 12 and the second substrate 16 can be formed with, for example, glass or resin. The pixel electrodes 9, the common electrode 11, the detection lines SNL, and the drive lines DRL can be formed with, for example, transparent electrodes such as electrodes made of indium tin oxide (ITO) or the like.

Figure 3:
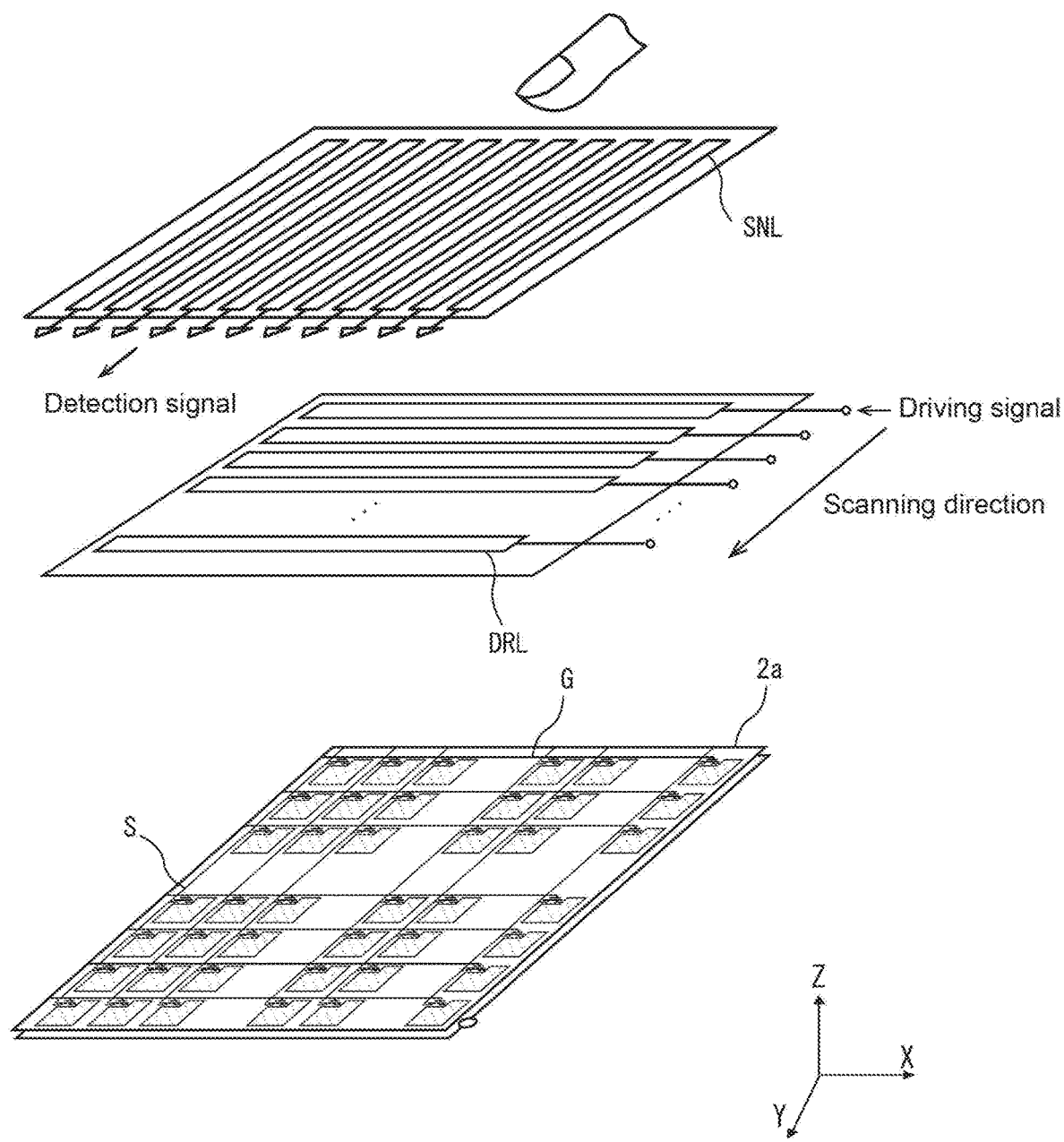
FIG. 3 is a perspective view illustrating an exemplary laminate configuration of drive lines, detection lines, gate lines G, and data lines.

FIG. 3 is a perspective view illustrating an exemplary laminate structure of the drive lines DRL, the detection lines SNL, the gate lines G, and the data lines S. In the example illustrated in FIG. 3, the layer of the gate lines G, the layer of the data lines S, the layer of the drive lines DRL, and the layer of the detection lines SNL, are laminated in the Z direction. Capacitors are formed between the drive lines DRL and the detection lines SNL. The capacitance at a position corresponding to each point of intersection between the drive lines DRL and the detection lines SNL changes depending on the approach or contact of an object. The matrix formed by the drive lines DRL and the detection lines SNL is arranged so as to overlap with the entirety of the display region 2a. This means that the drive lines DRL and the detection lines SNL are arranged in an area overlapping with an area where the gate lines G and the data lines S are provided.

In the example illustrated in FIG. 3, the gate lines G and the drive lines DRL are arranged so as to be parallel to each other. The gate lines G and the drive lines DRL do not have to be completely parallel. For example, the direction of the gate lines G and the direction of the drive lines DRL may be slightly different. Alternatively, the drive lines DRL may include some parts that are not parallel with the gate lines G.

To the drive lines DRL, a driving signal is input sequentially. To the detection lines SNL, response signals in response to the driving signal are output as detection signals. The detection signals contain information with regard to capacitances at positions corresponding to the points of intersection between the drive lines DRL and the detection lines SNL.

For example, the TP controller 30 repeats a scanning operation of sequentially applying a driving signal to the drive lines DRL in the first direction (the Y direction), and in response to the driving of the drive lines DRL, detects respective detection signals of the detection lines SNL. The driving signal includes a plurality of pulses. During respective periods while the drive lines DRL are driven, the TP controller 30 detects respective signals of the detection lines SNL. In the detected signals, changes in the capacitances around the drive lines DRL and the detection lines SNL are reflected. In other words, changes in the capacitances in the display region 2a (the screen) are detected as the detection signals of the detection lines SNL. The TP controller 30 is capable of calculating the position of contact or approach of an object with respect to the screen, based on the signals detected from the detection lines SNL. The TP controller 30 is an exemplary detection control unit.

The exemplary laminate structure of the gate lines G, the data lines S, the drive lines DRL, and the detection lines SNL is not limited to the example illustrated in FIGS. 2 and 3. For example, the order of lamination of the drive lines DRL and the detection lines SNL may be in the reverse order. Further, the drive lines DRL and the detection lines SNL can be formed in the same layer. Still further, the substrate on which the drive lines DRL and the detection lines SNL are formed is not limited to the second substrate 16, but the drive lines DRL and the detection lines SNL can be arranged on the first substrate 12, or can be arranged dispersedly on both of the first substrate 12 and the second substrate 16.

FIG. 1 is referred to again. The TP controller 30 controls the driving signal to be output to the drive lines DRL in the touch panel 20, based on the synchronization signal received from the timing controller 7. This makes it possible to control the drive line DRL to which the driving signal is to be output, according to the situation of selection of the gate line G in the screen scanning operation with respect to the gate lines G.

The TP controller 30 executes the screen scanning operation with respect to the drive lines DRL during a period for the screen scanning operation with respect to the gate lines G (that is, a period that overlaps with the period for updating the screen display). In the screen scanning operation with respect to the drive lines DRL, the controller 30 outputs the driving signal, avoiding the drive line in an area corresponding to the gate line G that is being selected by the scanning line driving circuit 4 (that is, the row of pixels that is being updated in the display). Here, the gate line G that is being selected is indicated by the synchronization signal.

The TP controller 30 controls the driving signals output to the drive lines DRL so that the gate line G and the drive line DRL, driven simultaneously, should not overlap with each other on the screen. In other words, while the screen scanning operation with respect to the gate lines G and the screen scanning operation with respect to the drive lines DRL are performed simultaneously, the driving signals output to the drive lines DRL are controlled so that the area in which the gate line G is to be driven and the area in which the drive line DRL is to be driven should not overlap with each other. The TP controller 30, for example, outputs the driving signal to a drive line DRL other than the drive line DRL in the area overlapping with the gate line G that is being selected, or alternatively, temporarily stops the outputting of the driving signal to any drive line DRL in the screen scanning operation with respect to the drive lines DRL. This makes it possible to output the driving signal, avoiding the drive line in an area corresponding to the gate line G that is being selected.

The synchronization signal, which the TP controller 30 receives from the timing controller 7, is a signal that is referred to for the timing of selection of each gate line G. In other words, the synchronization signal is a signal that controls the writing timing of each pixel row. The controller 30 therefore can grasp the timing of selection of the gate line G, with use of the synchronization signal. The synchronization signal can be considered to be a signal that indicates which gate line is currently selected (which is the gate line that is being selected), among the plurality of gate lines G. The controller 30 controls the outputting of the driving signal according to the synchronization signal, thereby being capable of outputting the driving signal, avoiding the drive line in an area corresponding to the gate line that is being selected.

The TP controller 30 can control the driving signal output to the drive lines DRL by using the perpendicular synchronization signal and the horizontal synchronization signal as the synchronization signals. At the timing of the pulse of the perpendicular synchronization signal, the screen scanning operation with respect to the gate lines G is started. At the timing of the pulse of the horizontal synchronization signal, each gate line G is selected. Further, at the timings according to the pulses of the horizontal synchronization signal, signals are output to the data lines S, whereby data of the signals are written to the pixels in each row. In the screen scanning operation with respect to the gate lines G, the gate lines G(1) to G(N) are selected sequentially one by one from the gate line G(1) at one of ends (for example, the upper end of the screen) toward the gate line G(N) at the other end (for example, the lower end of the screen). The TP controller 30, therefore, is capable of grasping the timing of selection of each gate line G, by using the perpendicular synchronization signal and the horizontal synchronization signal.

More specifically, in response to the pulse of the perpendicular synchronization signal as a trigger, the TP controller 30 starts the counting of the pulses of the horizontal synchronization signal. The number of pulses thus counted indicates how manieth row from the end the selected gate line G is in. In other words, the number of the pulses indicates the gate line G that is being selected. The TP controller 30 switches the drive line DRL to which the driving signal is to be output, from one to another, or stops outputting the driving signal, according to the number of the counted pulses, thereby to output the driving signal, avoiding the drive line DRL in an area corresponding to the gate line G that is being selected.

For example, the TP controller 30 switches the drive line DRL to which the driving signal is to be output, from one to another, every time when a predetermined number of pulses of the horizontal synchronization signal are generated. Here, the TP controller 30 can switch the drive lines DRL to which the driving signal is to be output, sequentially in a preliminarily determined order. In this case, the order of the drive lines DRL in which the driving signal is to be output to the drive lines DRL is set preliminarily so that the gate line G that is being selected, and the drive line DRL to which the driving signal is output should not overlap.

Further, the TP controller 30 can stop the outputting of the driving signal, when the number of counted pulses of the horizontal synchronization signal is in a preliminarily set range (the range of the driving prohibition period). Here, for example, in a case where the gate line is selected sequentially from the gate line G(1) at one side end toward the gate line G(N) at the other side end in the screen scanning operation with respect to the gate lines G, the driving signal can be input sequentially in an order from the drive line DRL(P) at the other side end toward the drive line DRL(1) at the one side end in the screen scanning operation with respect to the drive lines DRL. In other words, the direction of the screen scanning operation with respect to the gate lines G and the direction of the screen scanning operation with respect to the drive lines DRL can be opposite. The TP controller 30 can set the range of the number of pulses of the horizontal synchronization signal for which the outputting of the driving signal is stopped so that the period while the position of the gate line G that is being selected and the position of the drive line DRL to which the driving signal is to be output overlap with each other is the driving prohibition period.

The driving signal applied to one drive line DRL can include, for example, a plurality of pulses that are generated at a predetermined frequency. The TP controller 30 can work out a duration of time while the driving signal is output to one drive line DRL by referring to this number of pulses and the frequency. Further, by using the duration of time while the driving signal is output to one drive line DRL, and the pulse cycle of the horizontal synchronization signal, the TP controller 30 can work out the order of the drive lines DRL in which the driving signal is to be output to the drive lines, or can work out the period while the outputting of the driving signal is stopped in the screen scanning operation with respect to the drive lines, the order or the period being such that the position of the gate line G that is being selected and the position of the drive line DRL to which the driving signal is output should not overlap with each other.

<Exemplary Operation of Detection Device>

Figure 4:
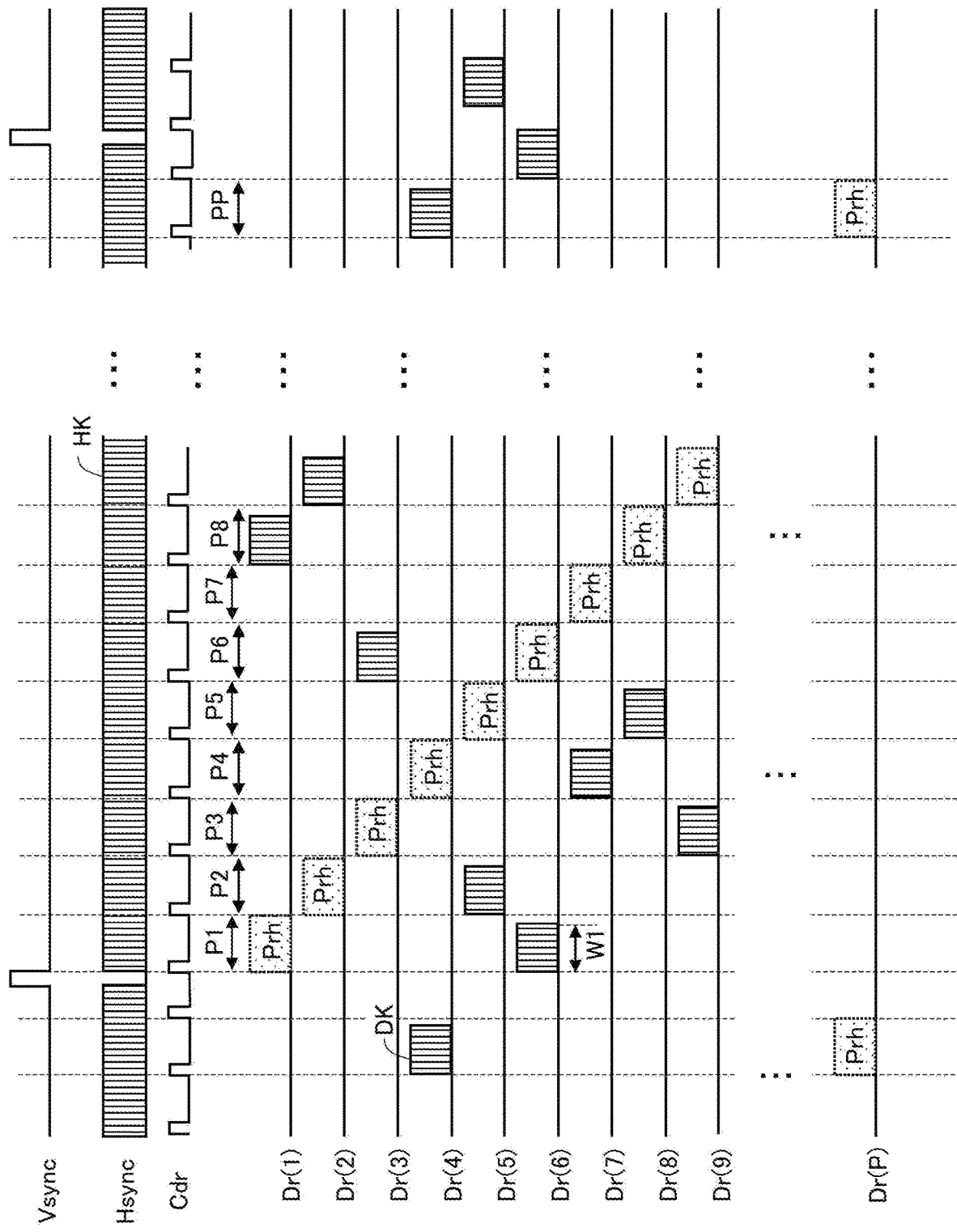
FIG. 4 illustrates exemplary waveforms of signals of the display device and the detection device.

FIG. 4 illustrates exemplary waveforms of signals while the TP controller 30 is operating. In FIG. 4, a rectangular HK (horizontal synchronization signal Hsync) having a plurality of vertical lines inside, and, a rectangular DK (driving signal Dr) represent waveforms that include a plurality of pulses. In the example illustrated in FIG. 4, the timing for driving the display device 2 is controlled according to a vertical synchronization signal Vsync and a horizontal synchronization signal Hsync in which pulses are generated at a certain set cycle.

The pulse interval of the vertical synchronization signal Vsync is one frame period. During one frame period, the gate lines G in one screen are scanned. For example, the pulse of the vertical synchronization signal Vsync serves as a trigger for the start of the screen scanning operation with respect to the gate lines G. The horizontal synchronization signal Hsync controls the timing for writing with respect to the pixels in each row. For example, at a timing when a pulse of the horizontal synchronization signal Hsync is generated, the selection signal is applied to one of the gate lines G, and video signals are applied to a plurality of the data lines S at once.

The TP controller 30 can grasp the timing at which the screen scanning operation with respect to the gate lines G starts, with use of the vertical synchronization signal Vsync. Further, the TP controller 30 can grasp the timing at which each gate line is selected and signals are input to the data lines S, that is, the writing timing, with use of the horizontal synchronization signal Hsync. The TP controller 30 can receive the vertical synchronization signal Vsync and the horizontal synchronization signal Hsync, for example, from the timing controller 7 or the system-side controller 10.

A control signal Cdr is a signal generated in the TP controller 30 on the basis of the perpendicular synchronization signal Vsync and the horizontal synchronization signal Hsync. In this example, the control signal Cdr controls the timing for switching the drive line DRL to which the driving signal is to be output from one to another. The control signal Cdr is a pulse that rises every time when a certain number (hereinafter, the number is assumed to be X) of pulses of the horizontal synchronization signal Hsync are generated, the number of pulses being counted with reference to the pulse of the perpendicular synchronization signal Vsync. In other words, the pulse cycle of the control signal Cdr is X times the pulse cycle of the horizontal synchronization signal Hsync. The value of X can be determined on the basis of, for example, the number of gate lines G arranged in an area corresponding to one drive line DRL. As one example, the number of the gate lines G that overlap with one drive line DRL when viewed in a direction vertical to the screen can be assumed to be X.

Figures 5, 6:
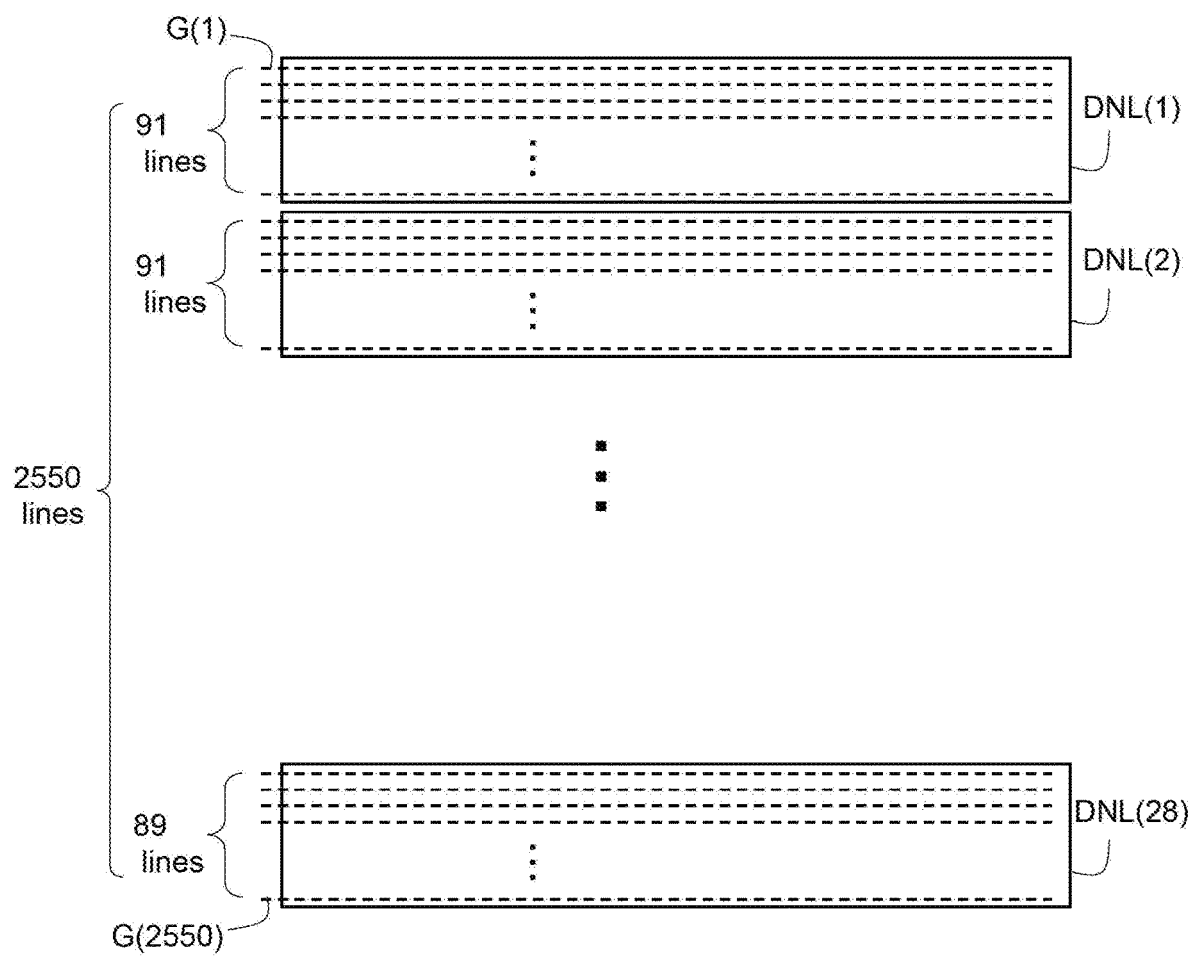
FIG. 5 illustrates an exemplary arrangement of gate lines G and drive lines DRL when viewed in a direction vertical to the screen.
FIG. 6 illustrates exemplary data indicating a preliminarily set order of the drive lines DRL.

FIG. 5 illustrates an exemplary arrangement of the gate lines G and the drive lines DRL when viewed in a direction vertical to the screen. FIG. 5 illustrates an example in a case where the display device 2 has a resolution of 2550×14440, and 28 drive lines DRL are provided (P=28). In this example, 91 gate lines G are arranged so as to overlap with one drive line DRL(1). In this way, each drive line DRL is arranged in correspondence to 91 gate lines G. It should be noted that since the gate lines G are 2550 in number, only the drive line DRL(28) at the lower end overlaps with 89 gate lines G. In the case illustrated in FIG. 5, the number X of the pulses of the horizontal synchronization signal Hsync that determines the pulse cycle of the control signal Cdr illustrated in FIG. 4 can be assumed to be X=91. In the screen scanning operation with respect to the gate lines G, at a timing when the drive line DRL overlapping with the gate line G that is being selected changes, the drive line DRL to which the driving signal is to be output can be switched from one to another.

In the example illustrated in FIG. 5, the drive line DRL in an area corresponding to the gate line G that is being selected is the drive line DRL that overlaps with the gate line G when viewed in a direction vertical to the screen. The form of the drive line DRL in an area corresponding to the gate line G is not limited to the form in the above-described example. For example, the drive line DRL at such a position that significant interference could occur between the foregoing drive line DRL and the gate line G, in addition to the drive line DRL that overlaps with the gate line G, can be the drive line DRL In an area corresponding to the gate line G.

As illustrated in FIG. 4, at the timing of the pulse of the control signal Cdr, the drive line DRL to which the driving signal Dr is to be output is switched from one to another sequentially. Here, the order in which the drive lines DRL are driven is not the same as the order in which the drive lines DRL are arrayed. For example, in the example illustrated in FIG. 4, the driving signals Dr(6), Dr(5), Dr(9), . . . are output to the sixth drive line DRL(6), the fifth drive line DRL(5), the ninth drive line DRL(9), which are the sixth, the fifth, and the ninth from the top, and other drive lines DRL, in the stated order. The order can be preliminarily determined, and recorded in a memory of the TP controller 30.

The switching of the drive lines DRL as the destination of outputting of the driving signal does not necessarily have to be the timings of the pulses of the control signal Cdr. For example, it is possible that the drive line DRL as a destination of outputting of the driving signal can be switched from one to another at n times (n is an integer of 2 or greater) per one pulse of the control signal Cdr (that is, at n-time cycles). The drive line DRL as a destination of outputting of the driving signal is switched from one to another at timings based on the control signal Cdr, whereby in the outputting of the driving signal, the drive line DRL in an area overlapping with the gate line G that is being selected, is avoided, and the driving signal is output to another drive line DRL.

The gate lines G(1) to G(N) are selected sequentially in the first direction. More specifically, the gate lines G(1) to G(N) are selected sequentially in the order of the array from one side end (from the upper end in the present example). In a period of a screen scanning operation, therefore, the respective timings at which the drive lines DRL(1) to DRL(P) overlap with the gate line G that is being selected can be predicted preliminarily. For example, in the example illustrated in FIG. 4, in each period denoted by "Prh", the drive line DRL overlaps with the gate line G that is being selected. The period Prh, therefore, can be the driving prohibition period of each drive line DRL.

More specifically, in the period P1, which is a period from when the pulse of the perpendicular synchronization signal Vsync is generated, while 91 horizontal synchronization signals Hsync are generated, in other words, the period P1 from the first pulse to the second pulse of the control signal Cdr, the gate lines G(1) to G(91), which are the first to the 91st from the top, are sequentially selected. The gate lines G(1) to G(91) overlap with the drive line DRL(1), which is the first from the top. During the period P1, therefore, the driving signal Dr(6) is output to another drive line DRL(6), with the drive line DRL(1) being avoided. The period P1 is the driving prohibition period Prh for the drive line DRL(1). The period P2 is the driving prohibition period Prh for the drive line DRL(2). During the period P2, the driving signal is output to the drive line DRL(5), which is other than the drive line DRL(2). Similarly, the subsequent periods P3, P4, . . . , are the driving prohibition periods Prh for the drive lines DRL(3), DRL(4), . . . .

In this way, the order of the drive lines DRL in which the driving signal Dr is to be output sequentially to the drive lines DRL is set preliminarily in such a manner that in each of the periods P1 to PP, which are defined by the control signal Cdr, the driving signal is output to a drive line other than the drive line to which the outputting of the driving signal is prohibited. In other words, the order of the drive lines DRL in which the driving signal is to be output to the drive lines DRL in the screen scanning operation is preliminarily set so that, in the outputting of the driving signal Dr, the drive line DR at a position overlapping with the gate line G that is being selected is avoided, and the driving signal Dr is output to another drive line DR.

The preliminarily set order of the drive lines DRL is recorded in, for example, a memory of the TP controller 30. FIG. 6 illustrates exemplary data indicating the preliminarily set order of the drive lines DRL. In the example illustrated in FIG. 6, the periods P1, P2, . . . and the drive lines DRL that are driven are recorded in a state of correspondence with each other, respectively. The order in which drive lines DRL are driven may be determined by the TP controller 30, by calculation using such values as the resolution and the frame rate of the display device 2, and the number of the drive lines DRL, the driving frequency, and the like of the touch panel 3.

In the example illustrated in FIG. 4, the duration of each period P1, P2, . . . PP, which is defined by the control signal Cdr, is equivalent to the period while the gate line G corresponding to an area of one drive line DRL is driven. In other words, each period P1, P2, . . . is a display writing time (display updating time) in an area corresponding to one drive line DRL. This time can be calculated, for example, in the following manner.

The following description describes, as an example, a case where the display device 2 has a resolution of 2550× 1440, and a frame rate of 60 Hz. The display writing time with respect to an area corresponding to one drive line DRL can be determined by the following calculation. First, the number of the gate lines G per one drive line DRL is calculated as [the resolution of the display unit (the vertical resolution)/the number of drive lines DRL]. In the present example, the number of gate lines G per one drive line DRL=2550/28=91.

Next, the display writing time per one gate line G is calculated as [the writing time per one frame/the resolution of the display unit (vertical resolution)]=16.6/2550=6.5 us. From the calculation described above, the display writing time per one drive line DRL can be worked out as follows:

91×6.5 us=595 us

This display writing time can be assumed to be, for example, the cycle of the control signal Cdr.

Or alternatively, the TP controller 30 can receive the perpendicular synchronization signal Vsync and the horizontal synchronization signal Hsync, which ae synchronization signals (timing signals), or a signal of a general-purpose input/output (GPIO), from the display device 2, and can calculate display writing time, time for diving one drive line DRL, and the like.

Further, in the above-described operation example, the TP controller 30 can determine the position of the gate line G that is being selected, that is, the display writing position, based on the perpendicular synchronization signal Vsync and the horizontal synchronization signal Hsync. This makes it possible to determine the respective driving prohibition timings for the drive lines DRL.

For example, the TP controller 30 counts the horizontal synchronization signal Hsync, using the perpendicular synchronization signal Vsync as a reset signal. Based on the count number, a control signal Cdr indicating the display writing timings for the areas corresponding to the drive lines DRL(1), DRL(2), . . . DRL(P) can be generated. Based on the timings indicated by the control signal Cdr, the TP controller 30 switches the drive line DRL to which the driving signal is output, from one to another, in a preliminarily determined order. As a result, the drive line DRL in an area where the display writing is being executed is avoided, and the driving signal can be output to another drive line DRL. In other words, the driving signal is not output to the drive line DRL whose display writing timing and TP sensing timing coincide with each other, and the sensing operation is executed with respect to another drive line DRL. This allows the display writing timing and the TP sensing area to be different from each other.

<Exemplary Order in which Drive Lines DRL are Driven>

The preliminarily set order of the drive lines DRL in which the driving signal is to be output to the drive lines DRL can be worked out, for example, by the TP controller 30. The following description describes an exemplary determining process for determining the above-described order by the TP controller 30.

The TP controller 30 uses, as parameters, for example, the number of the gate lines G and the drive lines DRL, the cycle of the perpendicular synchronization signal Vsync (the frame rate), the driving frequency of the driving signal and the cumulative number of the same, etc. As described above, the selection time of the gate line G (the display writing time) in an area overlapping with one drive line DRL can be calculated by using the number of the gate lines G and the drive lines DRL, and the cycle of the perpendicular synchronization signal Vsync. Further, the driving time for one drive line DRL, that is, the time for outputting the driving signal to one drive line (W1 indicated in FIG. 4) can be calculated by using the driving frequency and the cumulative number.

The TP controller 30 determines the driving prohibition period Prh for each drive line DRL by using the selection time of the gate line G in an area overlapping with one drive line DRL. In the example illustrated in FIG. 4, the periods P1, P2, . . . in which the gate lines G overlapping with the drive lines DRL, respectively, are selected, respectively, become the respective driving prohibition periods Prh for the drive lines DRL. Other than this example, the driving prohibition periods may be as follows: for example, certain periods before and/or after the periods P1, P2 in which the gate lines G in areas overlapping with the drive lines DRL, respectively, are selected, respectively, may be added to the driving prohibition periods Prh for the respective drive lines DRL.

Using the determined respective driving prohibition periods Prh for the drive lines DRL and the respective driving signal output times for the drive lines DRL, the TP controller 30 can determine such an order of the drive lines DRL that each period while the driving signal is output to the drive line DRL does not overlap with the driving prohibition period Prh for the same. As an example, the TP controller 30 first determines the order of the drive lines DRL at random. the TP controller 30 determines whether or not each of the respective driving periods for the drive lines DLR overlaps with the driving prohibition period Prh for the same in a case where the driving signal is output to the drive lines DRL(1) to (P) sequentially in the determined order. When determining that the overlap should occur, the TP controller 30 changes the order and repeats the above-described determination, and when determining that the overlap should not occur, the TP controller 30 records that order. The process of determining the order, however, is not limited to this.

<Drive Line DRL Driving Example 1>

Figure 7:
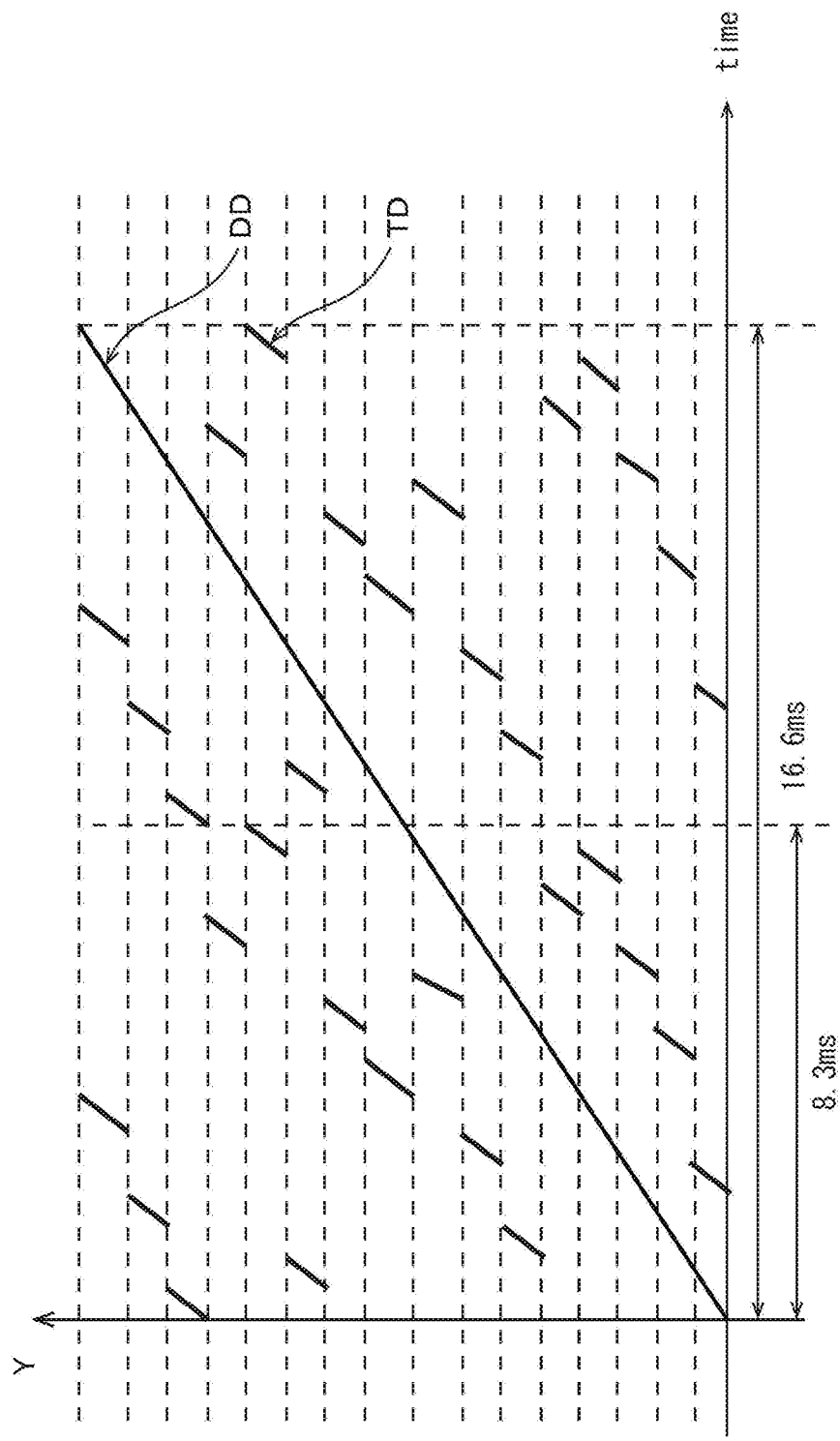
FIG. 7 illustrates how the drive lines DRL and the gate lines G are driven.

FIG. 7 illustrates how the drive lines DRL and the gate lines G are driven. In the graph illustrated in FIG. 7, the vertical axis indicates the position of the drive line DRL and the gate line G in the first direction (the Y direction), and the horizontal axis indicates time. Oblique lines TD indicate respective positions at which the drive lines DRL are driven, that is, the positions of sensing, and an oblique line DD indicates the positions at which the gate lines G are driven, that is, the positions of display writing. The same as these apply to FIG. 8 as well. In the example illustrated in FIG. 7, the gate lines G are driven sequentially in the order of the array from the one side end. The drive lines DRL are driven in an order different from the order of the array. More specifically, the drive lines DRL are driven in a preliminarily determined order. The order is set so that the position at which the drive line DRL is driven should be different from the position at which the gate line G is driven. This allows the driving of the drive lines DRL not to interfere with the display writing.

In the example illustrated in FIG. 7, the display unit has a frame rate of 60 Hz, and the touch panel has a sensing rate of 120 Hz. In other words, the cycle of the screen scanning operation with respect to the gate lines G is twice the cycle of the screen scanning operation with respect to the drive lines DRL. In this way, according to the driving method of the present embodiment, the frame rate of the display unit can be made different from the sensing rate of the touch panel.

<Drive Line DRL Driving Example 2>

In the above-described operation example, the order in which drive lines DRL are driven is preliminarily set. In contrast, the configuration can be such that a plurality of drive lines DRL adjacent to one another are assumed to be one section, and the order in which the sections are driven is preliminarily set.

Figure 8:
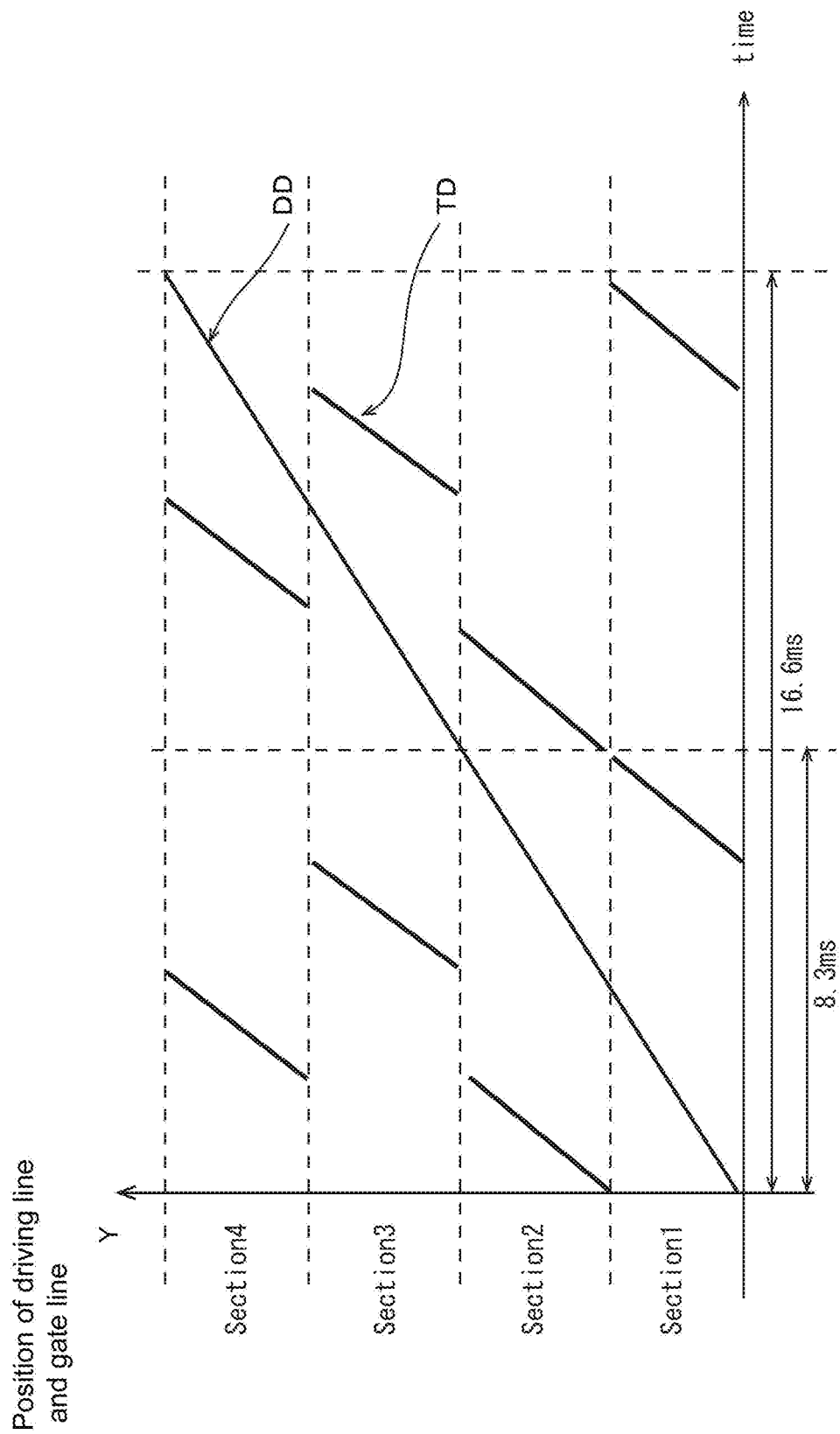
FIG. 8 illustrates an exemplary driving operation in a case where the order in which drive lines DRL are driven is set section by section, each section including a plurality of the drive lines DRL.

FIG. 8 illustrates an exemplary driving operation in a case where the order in which drive lines DRL are driven is set section by section, each section including a plurality of the drive lines DRL. In the example illustrated in FIG. 8, a plurality of drive lines DRL(1) to DRL(P) are divided in four sections. Each section includes a plurality of drive lines DRL that are adjacently arranged. To the drive lines DRL in one section, the driving signal is output sequentially in the order of the array. Or alternatively, the driving signal is output simultaneously to the drive lines DRL in one section so that the drive lines DRL in the section are driven in parallel.

The driving signal is output to a plurality of sections in a preliminarily determined order. In the example illustrated in FIG. 8, the order of the plurality of sections is set so that the driving signal is output to a section in an area that does not overlap with the gate line G that is being selected. In this way, the TP controller 30 can group all of the drive lines DRL(1) to DRL(P) into a plurality of sections, and output the driving signal section by section.

Embodiment 2

Figure 9:
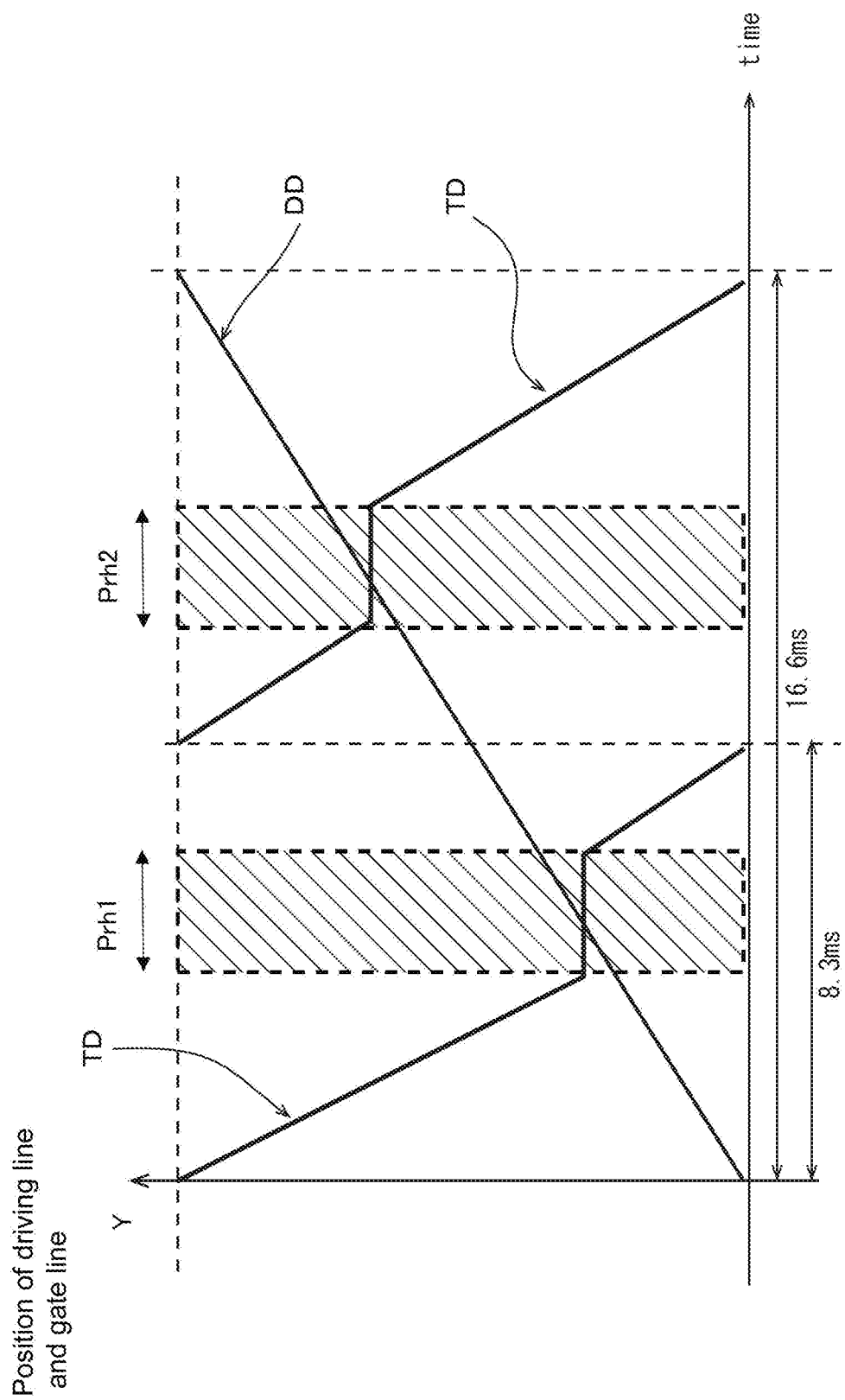
FIG. 9 illustrates how the drive lines DRL and the gate lines are driven in Embodiment 2.

FIG. 9 illustrates how the drive lines DRL and the gate lines are driven in Embodiment 2. In FIG. 9, the vertical axis indicates the position of the drive line DRL and the gate line G in the first direction (the Y direction), and the horizontal axis indicates time. Lines TD indicate respective positions of the drive lines DRL to which the driving signal is output, that is, the positions of sensing, and a line DD indicates the position at which the gate lines G are selected, that is, the positions of display writing.

In the example illustrated in FIG. 9, the gate lines G are selected sequentially from the lower end of the screen toward the upper end thereof. On the other hand, the drive lines DRL are driven sequentially from the upper end of the screen toward the lower end thereof. In other words, the direction of the screen scanning operation with respect to the gate lines G, and the direction of the screen scanning operation with respect to the drive lines DRL are opposite to each other. The gate lines G are arranged on the screen so as to be arrayed in the Y direction, and in the screen scanning operation, they are sequentially selected in the order of the array from the gate line at one of the ends (from the lower end of the screen in the present example). The drive lines DRL are arranged similarly so as to be arrayed in the Y direction, and in the screen scanning operation, the driving signal is output to the drive lines DRL sequentially in the order of the array from the drive line DRL at the other end (from the upper end of the screen in the present example).

In the period of one screen scanning operation with respect to the gate lines G, driving stop periods ST1, ST2 while the driving of the drive lines DRL is stopped are preliminarily set. During the driving stop periods ST1, ST2, the TP controller 30 stops outputting the driving signal to all of the drive lines DRL. In other words, in the driving stop periods ST1, ST2, the driving signal is output to none of the drive lines DRL.

The driving stop periods ST1, ST2 are set in a period while the following two areas meet: an area of the gate line G that is being selected, which shifts from one side end to the other side end; and an area of the drive line DRL to which the driving signal is output, which shifts from the other side end to the one side end. In other words, such a period that if the outputting of the driving signal is not stopped in the stopping period, the position at which the drive line DRL is driven, and the position at which the gate line G is being selected (the display writing position, that is, the display updating row) overlap with each other, can be set to be the driving stop periods ST1, ST. The driving stop periods ST1, ST2 can be calculated by using the driving frequency and the cumulative number of the driving signal, the cycle of the screen scanning operation with respect to the drive lines DRL, and the frame rate of the display device 2.

Figure 10:
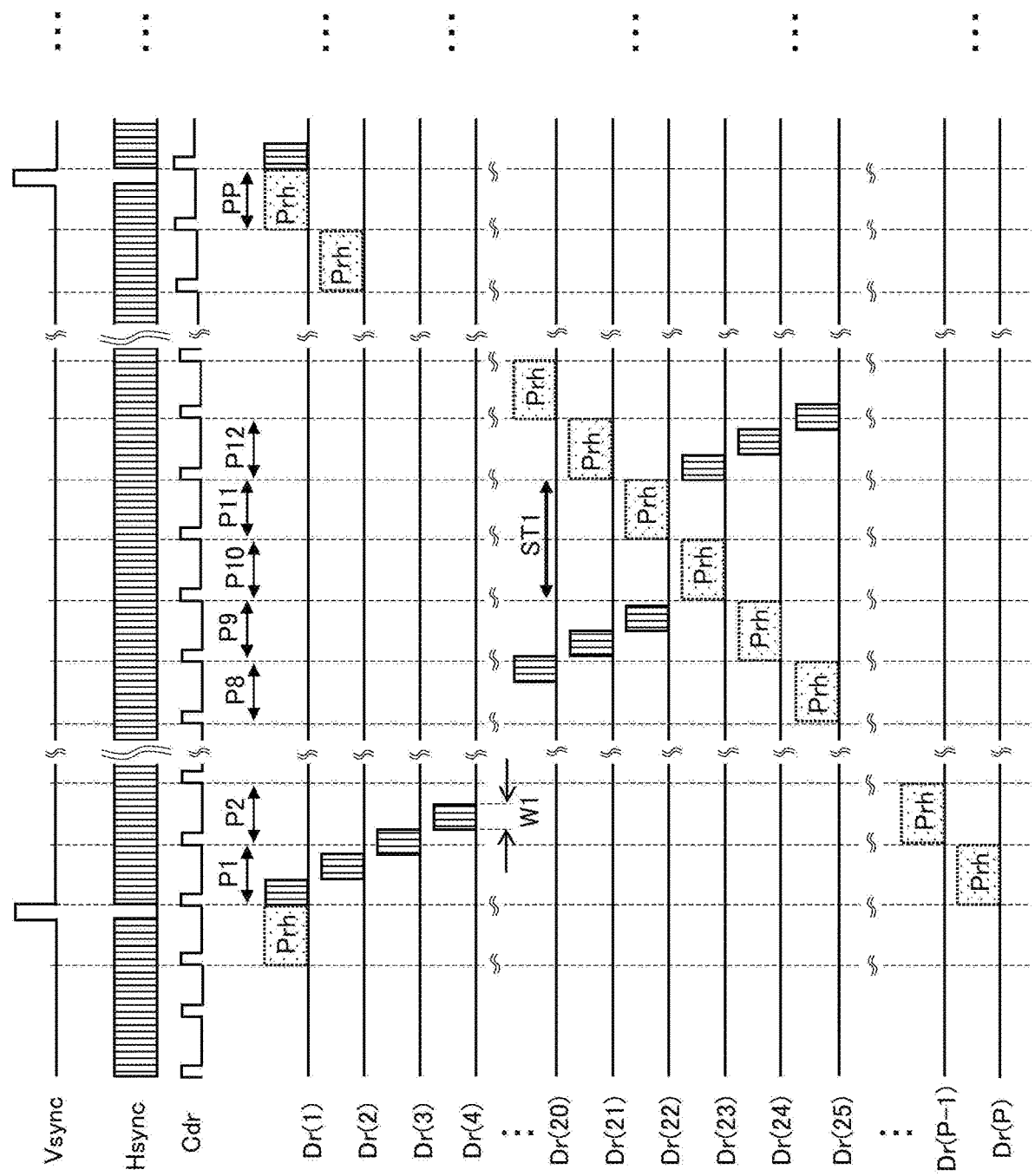
FIG. 10 illustrates exemplary signal waveforms in an operation illustrated in FIG. 9.

FIG. 10 illustrates exemplary signal waveforms in the operation illustrated in FIG. 9. In the example illustrated in FIG. 10, the screen scanning operation with respect to the drive lines DRL is performed by outputting the driving signal Dr to the drive lines DRL in the order of the array, from the drive line DRL(1) at the upper end to the drive line DRL(P) at the lower end. On the other hand, the screen scanning operation with respect to the gate lines G is performed by selecting the gate lines G in the order of the array, from the gate line G(N) at the lower end to the gate line G(1) at the upper end. The drive line DRL corresponding to the driving prohibition period Prh shifts from the drive line DRL(P) at the lower end sequentially upward.

In the example illustrated in FIG. 10, the timing of outputting the driving signal Dr to each drive line DRL is not restricted by the control signal Cdr. In other words, irrespective of the timing at which the drive line DRL that overlaps with the area of the gate line G that is being selected is switched, the drive line to which the driving signal Dr is output is switched. In other words, when a driving time W1 for one drive line DRL ends, immediately the driving of the next drive line DRL is started, irrespective of the control signal Cdr.

In the example illustrated in FIG. 10, in the period P9 while the gate line G in an area overlapping with the drive line DRL(24) is being selected, the driving signals Dr(21), Dr(22) are output to the drive lines DRL(21) and (22), respectively. In the period P10 while the area where the gate line G is being selected overlaps with the drive line DRL (23), if the driving is not stopped, the driving signal Dr(23) would be output to this drive line DRL(23). The periods P10, P11, however, are the driving stop periods ST1, and the driving signal Dr(23) is not output to the drive line DRL(23). This enables to output the driving signal, avoiding the drive line DRL in an area corresponding to a row of a pixel during display update.

In this example, the TP controller 30 determines the timing at which the outputting of the driving signal is stopped, based on the control signal Cdr. More specifically, the TP controller 30 can count the pulse of the control signal Cdr with reference to the perpendicular synchronization signal Vsync, and can stop the outputting of the driving signal when the number of pulses is in a preliminarily determined range for the driving stop period (when the number of pulses=10, 11 in the example illustrated in FIG. 10).

The TP controller 30 can calculate the driving stop periods ST1, ST2 by using for example, the driving frequency and the cumulative number of the driving signal, the cycle of the screen scanning operation with respect to the gate lines G, and the number of the drive lines DRL and the gate lines G. More specifically, the TP controller 30 calculates the driving time W1 of each drive line DRL from the driving frequency and the cumulative number of the driving signal DRL. Further, as mentioned above, the time while the gate line G in an area overlapping with one drive line DRL is being selected (display writing), that is, the driving prohibition period Prh for each drive line, is worked out by using the cycle of the screen scanning operation with respect to the gate lines G and the number of the drive lines DRL and the gate lines G. The TP controller 30 can determine the driving stop periods ST1, ST2 so that the driving of the drive line DRL should not overlap the driving prohibition period Prh, by using the driving time W1 and the driving prohibition period Prh for each drive line DRL.

<Exemplary Case where Driving Frequency is Changed>

The TP controller 30, for example, may have a frequency changing unit that changes the driving frequency. The frequency changing unit can determine an appropriate driving frequency according to, for example, such environments as noise and the like. In this case, the TP controller 30 can further include a setting unit that works out a period while the outputting of the driving signal is stopped in the screen scanning operation, that is, the driving prohibition periods Prh1, Prh2, based on the driving frequency. The setting unit can determine the driving stop period by using, for example, the driving frequency, as is the case with the driving stop periods ST1, ST2 described above. The frequency changing unit and the setting unit can be provided in the sensor-equipped display device in Embodiment 1. In this case, the setting unit can calculate the order of the drive lines in which the driving signal is to be output to the drive lines, according to the driving frequency, as is the case with Embodiment 1.

<Exemplary Configuration of TP Controller>

Figure 11:
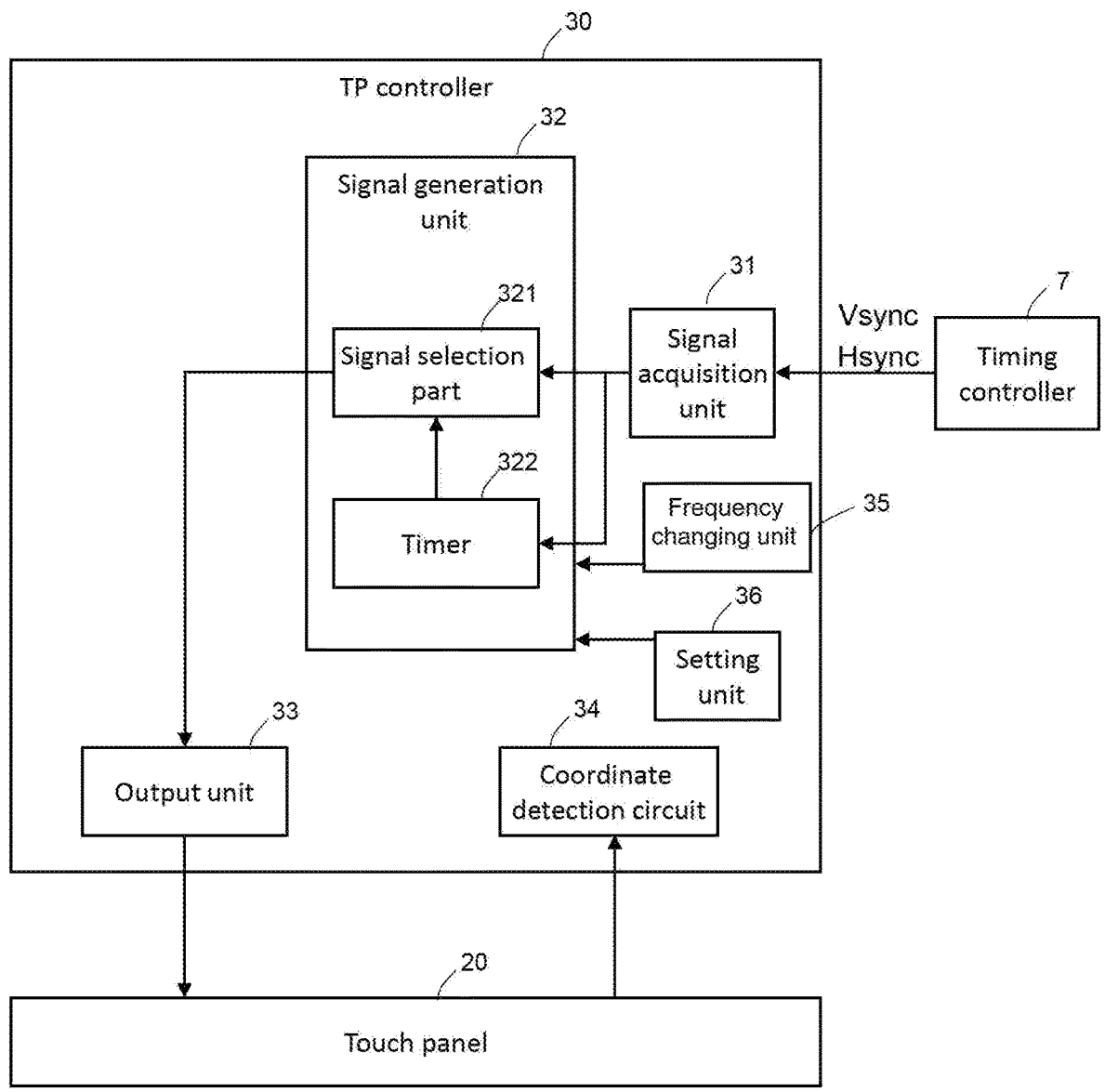
FIG. 11 is a functional block diagram illustrating an exemplary configuration of a TP controller 30.

The following description describes an exemplary configuration of the TP controller 30 that controls the touch panel 20 so as to realize the above-described operation. FIG. 11 is a functional block diagram Illustrating an exemplary configuration of the TP controller 30.

In the example illustrated in FIG. 11, the TP controller 30 includes a signal acquisition unit 31, a signal generation unit 32, an output unit 33, and a coordinate detection circuit 34. The signal generation unit 32 includes a signal selection part 321 and a timer 322.

The signal acquisition unit 31 receives a synchronization signal used for controlling the timing for updating the display of the screen, from the timing controller 7. The signal acquisition unit 31 includes, for example, a port for inputting a signal. The synchronization signal includes, for example, the vertical synchronization signal Vsync and the horizontal synchronization signal Hsync.

The signal generation unit 32 generates a signal for controlling the timing of detection scanning with respect to the screen, based on the synchronization signal that the signal acquisition unit 31 receives. In the detection scanning operation, the driving signal is applied to a plurality of the drive lines DRL sequentially. This is a scanning operation for detecting contact or approach of an object with respect to the touch panel 20.

The signal generation unit 32 generates a signal for such control that the following can be achieved: screen display updating is started during a period from the start of the detection scanning with respect to the screen to the end of the same, and the scanning time of the detection scanning with respect to one screen is equal to or shorter than the time for updating one screen display.

The output unit 33 outputs a signal generated by the signal generation unit 32 or a driving signal based on this signal, to the touch panel 20. The output unit 33 applies a driving signal to each drive line DRL, according to the signal generated by the signal generation unit 32.

The coordinate detection circuit 34 calculates coordinates indicating a position on the screen that an object is in contact with or approaches (a position on the touch panel 20), based on a detection signal detected by the detection lines SNL of the touch panel 20.

In the signal generation unit 32, the timer 322 generates an internal signal, based on the synchronization signal received by the signal acquisition unit 31, and outputs the internal signal to the signal selection part 321. The signal selection part 321 selects at least one signal from the internal generation signal generated by the timer 322 and the synchronization signal received by the signal acquisition unit 31, and transmits the selected signal to the output unit 33.

The timer 322 can generate a pulse when a preliminarily set period of time elapses from the rising or the falling of the pulse of the input signal. This makes it possible to generate, for example, a signal that includes a pulse having a predetermined cycle the pulse of the vertical synchronization signal Vsync. Further, a signal can be generated that has pulses generated at a predetermined cycle, for example, like the cycle of the pulses of the control signal Cdr or the driving signals Dr(1) to Dr(p) illustrated in FIG. 4.

For this configuration, the timer 322 can include an edge detection circuit that detects an edge (a rising edge or a falling edge) of a pulse of an input signal, a clock generation circuit that generates a clock signal having a certain frequency, a counter that counts the number of clock pulses of a clock signal after the edge detection, and an internal signal generation circuit that generates a pulse according to the count by the counter (all are not illustrated). Further, the timer 322 may include a counter that counts the number of pulses of the horizontal synchronization signal Hsync.

The internal signal generation circuit compares the count of the counter with a value preliminarily set in a register or the like, and when the count reaches the preliminarily set value, the internal signal generation circuit generates a pulse. In this case, pulse cycles of the control signal Cdr or the driving signals Dr(1) to Dr(p) illustrated in FIG. 4, or the like, can be set preliminarily.

The timer 322 can generate, as an internal signal, for example, a pulse signal as a base for the control signal Cdr or the driving signals Dr(1) to Dr(P), which are Illustrated in FIG. 4, or a driving synchronization signal for controlling a time for driving one drive line DRL, or the like.

The signal selection part 321 selects at least one signal to be supplied to the output unit 33, from the signals generated by the timer 322. For example, the signal selection part 321 can select the driving signals Dr(1) to Dr(p) for the respective drive lines DRL, which are generated by the timer 322. Or alternatively, the signal selection part 321 can select the pulse signal as a base for the driving signals Dr(1) to Dr(p), and the control signal Cdr indicating the driving timing.

Further, the signal selection part 321 may select the driving synchronization signal, which indicates the driving timing of each drive line DRL. The output unit 33 applies a driving signal to the drive lines DRL(1) to DRL(P), according to the signal output from the signal selection part 321.

Further, the signal generation unit 32 can supply, to the output unit 33, a signal that indicates the drive line DRL to which the driving signal is to be output, according to the preliminarily recorded data. For example, data indicating the order in which the drive lines DRL are driven can be preliminarily recorded in a memory or the like. The signal generation unit 32 supplies, to the output unit 33, a signal that Indicates the drive line DRL as a destination of outputting of the driving signal, according to the order indicated by the recorded data.

The TP controller 30 may further include a frequency changing unit 35 and a setting unit 36. The frequency changing unit 35 can change the driving frequency, in a case where, for example, the noise level exceeds a preliminarily set range. The noise level can be determined based on, for example, the signals detected at the detection lines SNL. The change of the frequency is executed by, for example, the frequency changing unit 35 selecting any one of a plurality of frequencies preliminarily set in the TP controller 30. For example, the technique of frequency hopping (FH) can be used in the change of the frequency. The setting unit 36 updates a setting value used by the signal generation unit 32, based on the driving frequency changed by the frequency changing unit 35.

The configuration of the TP controller 30 is not limited to the example illustrated in FIG. 10. For example, the coordinate detection circuit 34 can be arranged outside the TP controller 30. Further, the signal received by the signal acquisition unit 31 is not limited to the vertical synchronization signal Vsync and the horizontal synchronization signal Hsync; in place of these signals, or in addition to these signals, the signal acquisition unit 31 may receive another signal for controlling the update timing of the display screen. For example, the signal acquisition unit 31 can receive a general-purpose input/output (GPIO) from the timing controller 7. Still further, the signal acquisition unit 31 may receive a synchronization signal, not from the timing controller 7, but from the system-side controller 10.

The embodiments of the present invention are described above, but the present invention is not limited to the above-described embodiments. For example, the embodiments are described with reference to an exemplary driving operation in which a pulse signal is input to each of the drive lines DRL sequentially one by one, but the driving operation may be such that a pulse signal is input simultaneously to two or more of the drive lines DRL. Further, the above-described embodiments are examples of a mutual capacitance touch panel, but the touch panel may be a self-capacitance touch panel.

Further, the display device 2 is not limited to the liquid crystal display device as described above. The display device 2 may be, for example, an organic EL display, a plasma display, or a display in which electrophoresis or MEMS is used.

DESCRIPTION OF REFERENCE NUMERALS

1: sensor-equipped display device
2: display device
3: detection device
4: scanning line driving circuit (exemplary scanning driving unit)
5: data line driving circuit (exemplary data driving unit)
8: TFT (exemplary switching element)
9: pixel electrode
11: common electrode
20: touch panel
30: TP controller (exemplary detection control unit)
G: gate line (exemplary scanning line)
S: data line
DRL: drive line
SNL: detection line

The invention claimed is:

1. A sensor-equipped display device comprising a screen that displays an image, and a sensor that detects contact or approach of an object with respect to the screen, the sensor-equipped display device comprising:
   a plurality of scanning lines that are arrayed in a first direction;
   a plurality of data lines that are arrayed in a second direction that is different from the first direction;
   a plurality of switching elements that are provided in correspondence to points of intersection between the scanning lines and the data lines, respectively;
   a plurality of pixel electrodes that are connected to the switching elements, respectively;
   a scanning driving circuit that repeats a screen scanning operation with respect to the scanning lines, the screen scanning operation with respect to the scanning lines being an operation of selecting the scanning lines sequentially in the first direction throughout the screen;
   a data driving circuit that outputs a signal to the data lines in synchronization with the scanning of the scanning lines by the scanning driving circuit, thereby applying, to the pixel electrodes, voltages corresponding to gray levels to be displayed, respectively;
   a plurality of drive lines that are arrayed in the first direction;
   a plurality of detection lines that are arrayed in the second direction; and
   a detection controller that repeats a screen scanning operation of outputting a driving signal to the drive lines sequentially, and detects signals of the detection lines in correspondence to the driving signal,
   wherein, during a period that overlaps a period for the screen scanning operation with respect to the scanning lines, the detection controller executes the screen scanning operation with respect to the drive lines, and in the screen scanning operation with respect to the drive lines, the detection controller outputs the driving signal, avoiding the drive line in an area corresponding to the scanning line that is being selected by the scanning driving circuit,
   the detection controller controls the outputting of the driving signal according to a synchronization signal for controlling timings of the selection of the scanning lines by the scanning driving circuit, and
   the detection controller stops the outputting of the driving signal in the screen scanning operation at a timing based on the synchronization signal, thereby outputting the driving signal, avoiding the drive line in the area corresponding to the scanning line that is being selected.

2. The sensor-equipped display device according to claim 1,
   wherein the scanning driving circuit, in the screen scanning operation, selects the scanning lines sequentially, from the scanning line at one side end in the first direction to the scanning line at the other side end in the same direction, and the detection controller, in the screen scanning operation, outputs the driving signal to the drive lines sequentially, from the drive line at the other side end in the first direction to the drive line at the one side end, and stops the outputting of the driving signal at a timing at which a position of the scanning line that is to be selected overlaps a position of the drive line to which the driving signal is to be output.

3. The sensor-equipped display device according to claim 1, wherein the detection controller further includes:

a frequency changing unit that changes a driving frequency of the driving signal; and a setting unit that determines, based on the driving frequency, the order of the drive lines to which the driving signal is to be output, or a period in which the outputting of the driving signal is stopped in the screen scanning operation.

4. The sensor-equipped display device according to claim 1, wherein the synchronization signal includes a perpendicular synchronization signal and a horizontal synchronization signal that the scanning driving circuit refers to when operating, and the detection controller controls the outputting of the driving signal, according to the number of pulses of the horizontal synchronization signal that are counted with reference to the perpendicular synchronization signal.

5. A control device that controls electronic equipment that includes a screen that has a matrix of pixels, a plurality of drive lines arrayed in a direction vertical to rows of the pixels in an area that overlaps with the screen, and detection lines arrayed in a direction vertical to columns of the pixels, the electronic equipment detecting contact or approach of an object with respect to the screen based on signals of the detection lines, the control device comprising:

a signal acquisition circuit that receives a synchronization signal for controlling a timing at which updating of display of pixels in each row of the screen is started;

a signal generation circuit that generates a control signal for controlling a driving signal to be output to the drive lines based on the synchronization signal; and an output circuit that outputs the control signal generated by the signal generation circuit, or the driving signal based on the control signal, wherein the signal generation circuit, in a period overlapping with a period for the updating of display of the screen, executes a screen scanning operation for outputting the driving signal to the drive lines, and in the screen scanning operation with respect to the drive lines, generates the control signal so that the driving signal is output, avoiding the drive line in an area corresponding to a row of the pixels being subjected to the updating of display, the signal generation circuit controls the outputting of the driving signal according to a synchronization signal for controlling timings of the updating of display, and the signal generation circuit stops the outputting of the driving signal at a timing based on the synchronization signal, thereby outputting the driving signal, avoiding the drive line in the area corresponding to the row of the pixels being subjected to the updating of display.

6. A control method for controlling electronic equipment that includes a screen that has a matrix of pixels, a plurality of drive lines arrayed in a direction vertical to rows of the pixels in an area that overlaps with the screen, and detection lines arrayed in a direction vertical to columns of the pixels, the electronic equipment detecting contact or approach of an object with respect to the screen based on signals of the detection lines, the control method comprising:

an action of receiving a synchronization signal for controlling a timing at which updating of display of pixels in each row of the screen is started;

a signal generation action of generating a control signal for controlling a driving signal to be output to the drive lines based on the synchronization signal; and an outputting action of outputting the control signal generated in the signal generation action, or the driving signal based on the control signal, wherein, in the signal generation action, in a period overlapping with a period for the updating of display of the screen, a screen scanning operation for outputting the driving signal to the drive lines is executed, and in the screen scanning operation with respect to the drive lines, the control signal is generated so that the driving signal is output, with the drive line in an area corresponding to a row of the pixels being subjected to the updating of display being avoided, in the signal generation action the outputting of the driving signal is controlled according to a synchronization signal for controlling timings of the updating of display, and in the signal generation action, the outputting of the driving signal is stopped at a timing based on the synchronization signal, such that the driving signal is outputted, avoiding the drive line in the area corresponding to the row of the pixels being subjected to the updating of display.

* * * * *